(12) United States Patent
Mohamed Sayed Ahmed et al.

(10) Patent No.: US 10,811,990 B1
(45) Date of Patent: Oct. 20, 2020

(54) MULTI-SEGMENT AND NONLINEAR DROOP CONTROL FOR PARALLEL OPERATING ACTIVE FRONT END POWER CONVERTERS

(71) Applicant: Rockwell Automation Technologies, Inc., Mayfield Heights, OH (US)

(72) Inventors: Ahmed S. Mohamed Sayed Ahmed, Mequon, WI (US); Lixiang Wei, Mequon, WI (US); Ehsan Al-Nabi, Cambridge (CA); Nirav Patel, Kitchener (CA); Sang Woo Nam, Cambridge (CA)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 16/370,503

(22) Filed: Mar. 29, 2019

(51) Int. Cl.
*H02M 7/06* (2006.01)
*H02M 1/00* (2006.01)

(52) U.S. Cl.
CPC ........... *H02M 7/064* (2013.01); *H02M 7/068* (2013.01); *H02M 2001/0067* (2013.01)

(58) Field of Classification Search
CPC ...... H02M 7/2173; H02M 7/219; H02M 7/23; H02M 7/217
See application file for complete search history.

(56) References Cited

U.S. PATENT DOCUMENTS

| 10,389,263 | B2* | 8/2019 | Baumann | H02M 5/458 |
| 2007/0274114 | A1 | 11/2007 | Neacsu | |
| 2013/0073109 | A1 | 3/2013 | Cheng et al. | |
| 2014/0268953 | A1* | 9/2014 | Patel | H02M 7/217 363/89 |
| 2014/0268954 | A1* | 9/2014 | Wei | H02M 7/217 363/89 |
| 2019/0047433 | A1* | 2/2019 | Rozman | B60L 1/006 |

* cited by examiner

*Primary Examiner* — Jeffrey A Gblende
(74) *Attorney, Agent, or Firm* — Fay Sharpe LLP

(57) ABSTRACT

An active rectifier includes first and second DC nodes, a switching circuit, and a controller configured to compute a voltage reference according to a load signal of the DC output, and a non-linear relationship between a load condition of the DC output and a DC bus voltage at the DC output, and to generate rectifier switching control signals according to the voltage reference to cause the switching circuit to convert AC input power from the AC input to control the DC bus voltage at the DC output.

20 Claims, 8 Drawing Sheets

US 10,811,990 B1

MULTI-SEGMENT AND NONLINEAR DROOP CONTROL FOR PARALLEL OPERATING ACTIVE FRONT END POWER CONVERTERS

BACKGROUND INFORMATION

The subject matter disclosed herein relates to power conversion systems and active rectifiers.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present the concept of the disclosure in a simplified form prior to the more detailed description that is presented hereinafter.

An active rectifier is disclosed, having first and second DC nodes, a switching circuit, and a controller configured to compute a voltage reference according to a load signal of the DC output, and a non-linear relationship between a load condition of the DC output and a DC bus voltage at the DC output, and to generate rectifier switching control signals according to the voltage reference to cause the switching circuit to convert AC input power from the AC input to control the DC bus voltage at the DC output.

A power conversion system includes a first active rectifier with first and second DC nodes, a first switching circuit, and a first controller configured to compute a first voltage reference according to a first load signal of a first DC output, and a first non-linear relationship between a first load condition of the first DC output and a DC bus voltage at the DC output. The first controller is further configured to generate first rectifier switching control signals according to the first voltage reference to cause the switching circuit to convert first AC input power from the first AC input to control the DC bus voltage. The system includes a second active rectifier with a second switching circuit, and a second controller configured to compute a second voltage reference according to a second load signal of a second DC output, and a second non-linear relationship between a second load condition of the second DC output and a DC bus voltage at the DC output. The second controller is further configured to generate second rectifier switching control signals according to the second voltage reference to cause the second switching circuit to convert second AC input power from the second AC input to control the DC bus voltage.

A method includes computing a voltage reference according to a load signal of a DC output of an active rectifier, and a non-linear relationship between a load condition of the DC output and a DC bus voltage at the DC output, as well as generating switching control signals for the active rectifier according to the voltage reference to cause a switching circuit of the active rectifier to convert AC input power from an AC input to control the DC bus voltage.

DETAILED DESCRIPTION

Figure 1:
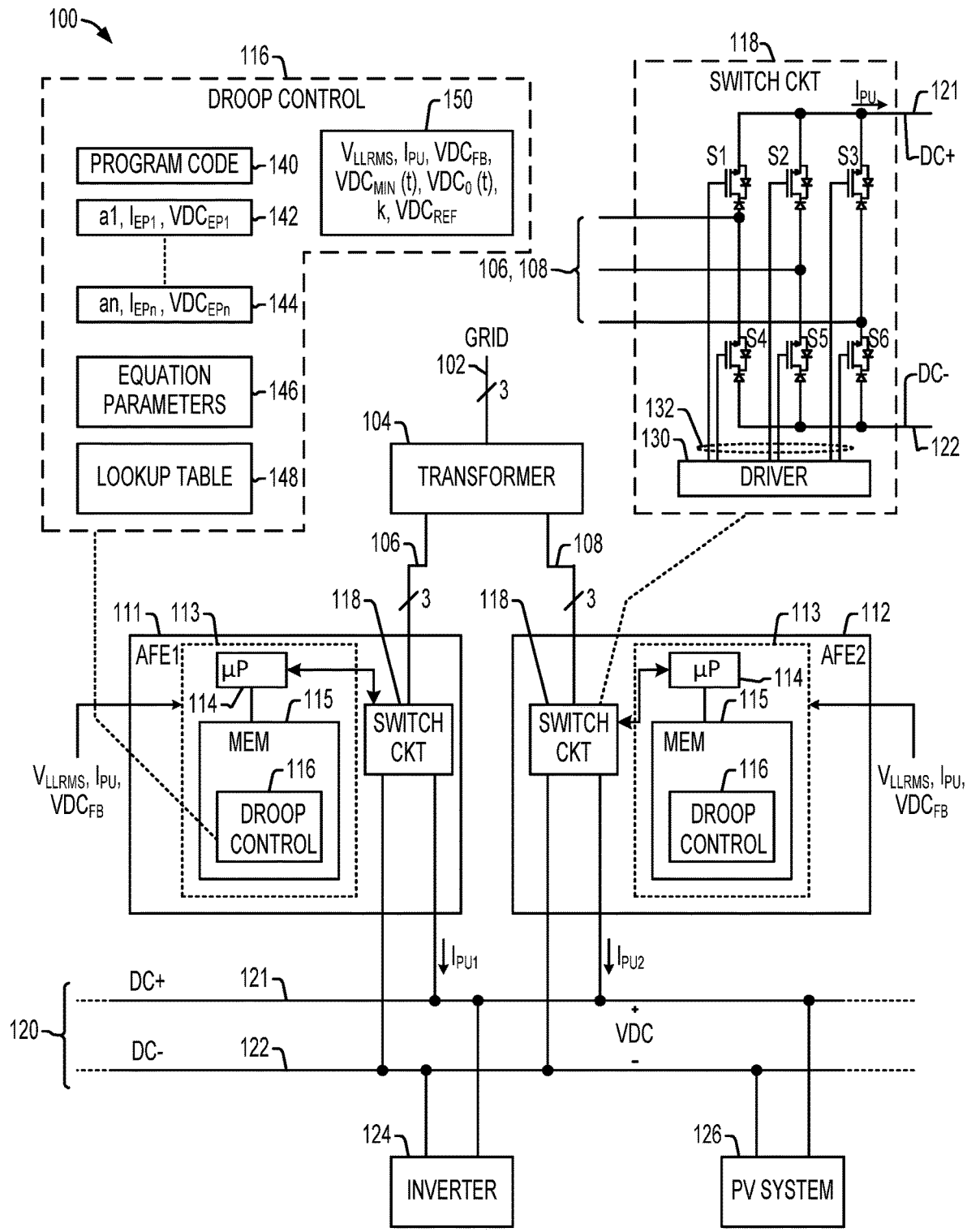
FIG. 1 is a schematic diagram.

Referring now to the figures, several embodiments or implementations are hereinafter described in conjunction with the drawings, wherein like reference numerals are used to refer to like elements throughout, and wherein the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical or mechanical connection or combinations thereof. For example, if a first device couples to or is coupled with a second device, that connection may be through a direct electrical connection, or through an indirect electrical connection via one or more intervening devices and connections.

Active front end (AFE) rectifiers (e.g., also referred to as AFE converters) can regenerate power to an AC grid or convert AC input power to a DC bus. Unlike passive (e.g., diode) rectifiers, AFE rectifiers can provide power factor control (PFC), for example, to provide at or near unity power factor, with minimum current distortion (e.g., typically less than 5% according to IEEE standards). The AFE rectifier can be used in motor-drive applications where the AFE DC output is connected to multiple inverters or to one inverter controlling motor speed and/or torque. The AFE rectifier can also be used in grid tie applications where the DC side is connected to a DC Bus supply such as a fuel cell, or solar cell, etc. Droop control can be used for controlling multiple AFE rectifiers connected to a shared DC bus. One droop control approach involves detecting the angle difference between rectifiers and uses real time communication between all units. Other approaches use rectifier switching frequency control.

FIG. 1 shows a power conversion system 100 with a DC bus shared by multiple components. The system 100 includes an AC grid 102, such as a three-phase grid, although other examples are possible using a single phase grid or a multi-phase grid having more than three phases (not shown). A transformer 104 is connected between the three phase grid 102 and multiple multiphase AC connections. In one example, a primary winding of the transformer 104 is connected to the AC grid 102, and the transformer 104 includes multiple secondary windings (not shown). In this example, a set of three first AC nodes 106 are connected to a first secondary of the transformer 104, and a set of three second AC nodes 108 are connected to a second secondary of the transformer 104. In other examples, one or more of the secondaries can be single phase arrangements, or multiphase arrangements having more than three phases (not shown).

The example of FIG. 1 includes first and second three-phase secondaries connected to respective first and second active rectifiers 111 (labeled AFE1) and 112 (labeled AFE2). In other implementations, more than two active rectifiers can be connected to a single shared DC bus. The first rectifier 111 includes a first AC input, including the first AC nodes 106, as well as a first DC output. The first rectifier 111 also includes a first controller. In one example, the controller 113 includes a processor 114 (e.g., a microprocessor, microcontroller, FPGA, logic circuit, etc.). The processor 114 is operatively connected to an electronic memory 115 that stores program instructions and/or data. In one example, the memory 115 stores program instructions that implement a droop control component 116 as described further hereinafter. The first rectifier 111 also includes a first switching circuit 118 coupled with the first AC input and with the first DC output. The second rectifier 112 is similar to the first rectifier 111, and includes a second AC input, including the second AC nodes 108, a second DC output connected to the first DC output of the first rectifier 111 along the shared DC bus. The second rectifier 112 also includes a controller 113 with a processor 114, and an electronic memory 115 that stores program instructions and/or data to implement a droop control component 116.

FIG. 1 also shows a shared DC bus 120 with first and second DC nodes 121 (labeled DC+) and 122 (labeled DC−), respectively, connected to the DC outputs of the rectifiers 111 and 112. In motoring operation, the rectifiers 111 and 112 individually convert corresponding AC input power to develop a DC bus voltage VDC between the first and second DC nodes 121 and 122. In particular, the first active rectifier 111 provides a first DC output current signal $I_{PU1}$ to the DC bus 120, and the second active rectifier 112 separately provides a second DC output current signal $I_{PU2}$ to the DC bus 120, where the "PU" designation indicates per-unit valuation. The example power conversion system 100 includes a switching inverter 124 with a DC input connected to the DC bus 120, as well as a photovoltaic (PV) system 126 with a DC output connected to the DC bus 120. In operation, the first and second rectifiers 111 and 112 can each deliver power from the respective AC nodes 106, 108 to the DC bus 120 in "motoring" operation, and can transfer power from the DC bus 120 to the respective AC nodes 106, 108 in "regeneration" or "regen" operation, for example, where a motor load (not shown) driven by the inverter 124 is decelerating, or where energy from the photovoltaic system 126 is being delivered through the DC bus 120 and the inverters 111, 112 to the grid 102.

FIG. 1 shows further details of one of the switching circuits 118, including switching devices S1-S6 individually connected between a corresponding one of the respective AC input lines 106, 108 and a corresponding node 121 or 122 of the shared DC bus. The respective switching devices S1-S6 are configured to selectively couple one of the AC nodes 106 or 108 with a respective one of the first and second DC nodes 121, 122 according to a respective switching control signal. The switching circuit 118 in one example includes a driver circuit 130 that provides switching control signals 132 to the respective switching devices S1-S6 under control of the processor 114 of the controller 113. The switching devices S1-S6 are respectively configured to selectively couple a corresponding one of the first AC nodes 106 with a respective one of the first and second DC nodes 121, 122 according to a respective switching control signal 132 from the controller 113 (e.g., via any intervening driver circuit 130) for motoring and/or regeneration operation of the corresponding AFE rectifier 111, 112.

FIG. 1 shows further details of an example storage organization in the respective AFE controller memories for processor-implementation of the droop control component 116 in the electronic memory 115. The example droop control components 116 of the respective rectifiers 111 and 112 operate independently of one another. In this manner, the rectifiers 111 and 112 do not need to communicate with one another for shared control of the DC bus voltage VDC of the DC bus 210. Moreover, the droop control components 116 implement intelligent non-linear and/or multi-segment droop control to mitigate rectifier derating. Furthermore, the example droop control components 116 of the respective rectifiers 111 and 112 can be configured similarly or can have different configuration parameters and settings, for instance, to facilitate load sharing between rectifiers of different sizes or ratings, to operate the shared DC bus 120.

The example droop control component 116 in the rectifier controllers 113 include program code or instructions 140 that cause the processor 114 to implement the droop control concepts described herein. The droop control component 116 in one example includes an integer number "n" linear equations and associated parameters 142, 144, where n is greater than or equal to 2. The parameters 142, 144 define a multi-segment function with two or more segments having different respective slopes that relate a load condition of the DC output to the DC bus voltage VDC. In another implementation, the droop control component 116 includes one or more second or higher order formulas and associated equation parameters 146 that relate the respective load conditions of the DC output to the DC bus voltage VDC. In one example, the droop control component 116 in the rectifier controller 113 includes a lookup table 148 with entries that relate load conditions of the DC output to respective DC bus voltages VDC at the DC output according to the second or higher order formula.

In one example, the droop control component 116 in the rectifier controller 113 also includes (e.g., samples and stores in the memory 115) various operating parameters or values and computed reference values 150 used in operation of the rectifier 111, 112. On example includes a root-mean-square line to line voltage $VLL_{RMS}$ of the AC input for a given control cycle, a load signal (e.g., DC output current signal $I_{PU}$) of the DC output, a sampled DC bus voltage feedback signal $VDC_{FB}$, a computed minimum DC bus voltage value $VDC_{MIN}(t)$ for a given rectifier switching control cycle, a computed no load DC bus voltage value $VDC_0(t)$ for the given control cycle, a constant k, and a computed voltage reference $VDC_{REF}$ for the given control cycle. The root-mean-square line to line voltage $VLL_{RMS}$, the load signal (e.g., DC output current signal $I_{PU}$) of the DC output, and the sampled DC bus voltage feedback signal $VDC_{FB}$ for each rectifier 111, 112 are sampled and provided to the respective controllers 113 for each control cycle in one example.

Figure 2:
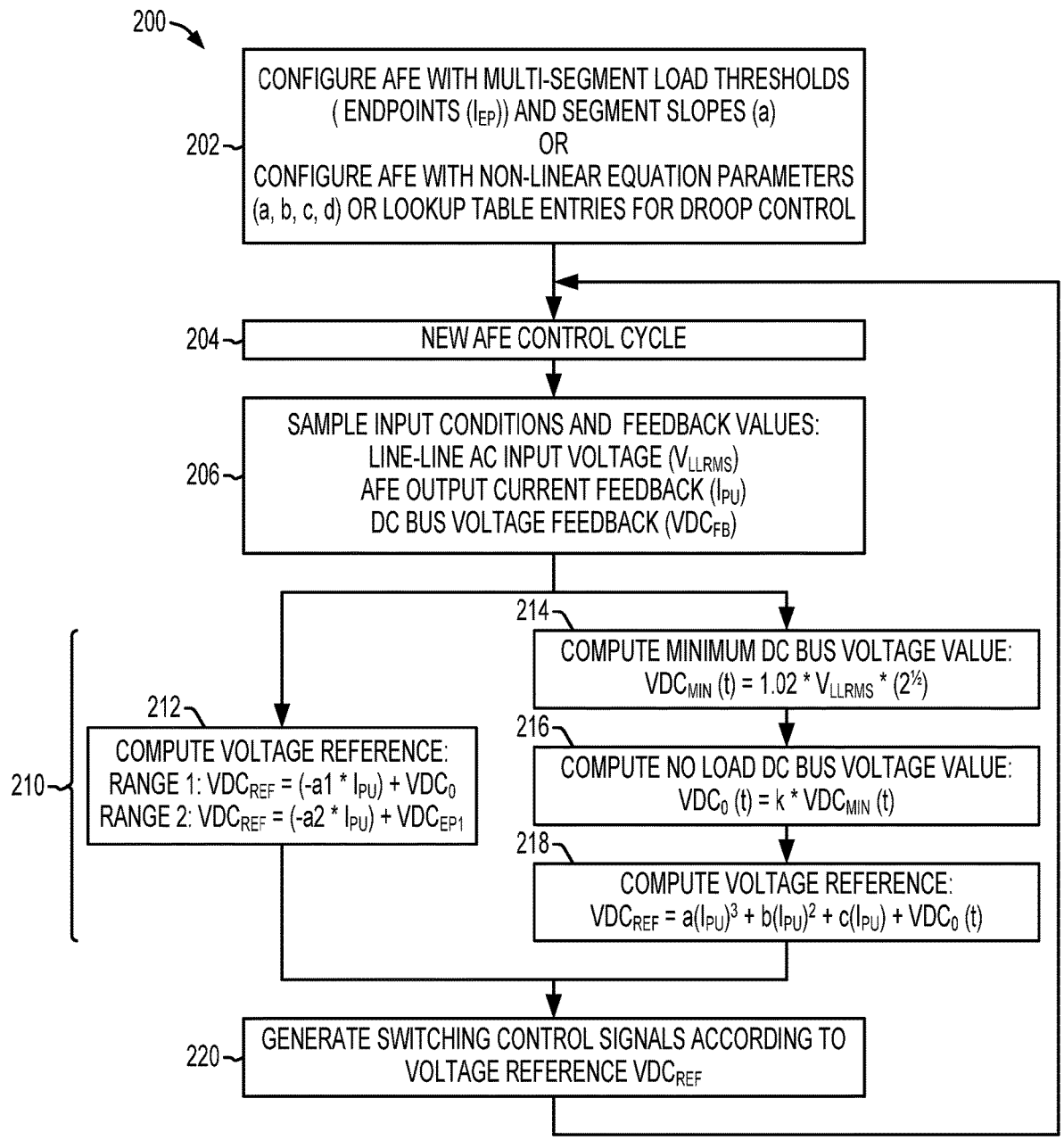
FIG. 2 is a flow diagram.

Referring also to FIG. 2, the controller 113 of FIG. 1 in one example implements the droop control component 116 according to a method 200 in FIG. 2. The method 200 in one example is implemented concurrently in multiple active rectifiers (e.g., rectifiers 111 and 112 in FIG. 1) for independent autonomous operation of the parallel units four balanced load sharing with droop control. FIG. 2 illustrates operation of a single one of the active rectifiers 111, 112, and the other rectifier is similarly configured and operated.

At 202, the controllers 113 are configured with parameters for multi-segment and/or non-linear formulas and/or lookup table entries to implement multiple autonomous rectifier operation in the shared DC bus system 100, such as the elements and entries 142, 144, 146 and/or 148 in the respective droop control components 116 of FIG. 1. The configuration data in one example is stored in the electronic memory 115 at 204. In one example, the controller 113 is configured by an external configuration source, such as a computer that sends configuration information to the controller 113 by a network connection (not shown). In another example, the rectifier 111, 112 includes a user interface (not shown), and the configuration at 202 is performed via the interface. In one example, the controller 113 is configured at 202 with multi-segment load thresholds (e.g., endpoints (e.g., segment range and point current values $I_{EP}$)) and segment slopes (e.g., a1, a2, . . . ) for multi-segment droop control. In another example, the controller 113 is configured at 204 with non-linear equation parameters (a, b, c, d) or lookup table entries for droop control.

Each new rectifier switching control cycle begins at 204 in FIG. 2, and the controller 113 samples input conditions and feedback values at 206. In one example, the controller 113 samples the line-line AC input voltage ($VLL_{RMS}$), the AFE output current feedback ($I_{PU}$) and the DC bus voltage feedback ($VDC_{FB}$) at 204 for the present control cycle. For the given control cycle, the controller 113 computes a voltage reference value $VDC_{REF}$ at 210 according to a load signal, such as a rectifier output current value $I_{PU}$ of the DC output, and according to a first non-linear relationship between a load condition of the DC output and the DC bus voltage VDC across the first and second DC nodes 121, 122. At 220 in FIG. 2, the controller 113 generates the switching control signals 132 according to the computed voltage reference $VDC_{REF}$ for the given control cycle to cause the switching circuit 118 to convert AC input power from the AC input to control the DC bus voltage VDC. As previously discussed, the individual active rectifiers 111, 112 each implement the processing in FIG. 2 autonomously, and may be operated at different switching frequencies with asynchronous switching cycles, although not a requirement of all possible implementations. In the illustrated example of FIG. 2, with first and second rectifiers 111 and 112, the first load signal $I_{PU1}$ of the first DC output is the first DC output current signal $I_{PU1}$ of the first DC output, and the second load signal $I_{PU2}$ of the second DC output is the second DC output current signal $I_{PU2}$ of the second DC output.

In one example, the non-linear relationship is a multi-segment function with multiple segments having different respective slopes that relate the load condition of the DC output to the DC bus voltage VDC at the DC output. In one example, the non-linear relationship is a second or higher order formula 146 that relates the load condition of the DC output to the DC bus voltage VDC at the DC output. In one example, the load signal $I_{PU}$ of the DC output is a DC output current signal $I_{PU}$ of the DC output (e.g., $I_{PU1}$ or $I_{PU2}$).

In one implementation (e.g., FIG. 3 below), the respective first and second non-linear relationships are multi-segment functions with multiple segments having different respective slopes that relate the load condition of the DC output to the DC bus voltage VDC. In this example, the controller 113 computes the DC voltage reference value $VDC_{REF}$ at 212 for a dual segment implementation according to one of two possible ranges of the loading of the rectifier 111, 112. In this example, each rectifier 111, 112 is configured with parameters associated with to power ranges (e.g., ranges of the corresponding load signal $I_{PU}$). In this example, the controller 113 computes the DC voltage reference value $VDC_{REF}$ for the first range as $(-a1*I_{PU})+VDC_0$, where a1 is a corresponding first slope used for the first range. For a second range, the controller 113 computes the DC voltage reference value $VDC_{REF}=(-a2*I_{PU})+VDC_{EP1}$, where a2 is a different second slope, and $VDC_{EP1}$ is the endpoint of the defined first range, which is the same as the start point of the second range. Any combination of multiple segments can be used in various implementations, including multiple linear segments (e.g., piecewise linear), multiple curvilinear segments, or combinations of at least one linear segment and at least one curvilinear segment. In the illustrated example, the multi-segment function includes two or more segments having different respective slopes that relate the load condition of the DC output to the DC bus voltage VDC at the DC output. In another example, more than two segments are used, and at least two of the segments have different respective slopes that relate the load condition of the DC output to the DC bus voltage VDC at the DC output.

In another example (e.g., FIG. 4 below), the non-linear relationships implemented by the respective controllers 113 are second or higher order formulas 146 that relate the load conditions of the respective first and second DC outputs to the DC bus voltage VDC. In the example of FIG. 2, the controller 113 implements the computation at 210 by computing a minimum DC bus voltage value at 214 according to the sampled line-line AC input voltage, computes a no-load DC bus voltage value at 216 according to the computed minimum DC bus voltage value, and computes the voltage reference value at 218 by solving the second or higher order formula 146, or by indexing a lookup table 148.

In one implementation, the controller 113 selectively adjusts the non-linear relationship according to the operating condition of the rectifier 111, 112, for example, to accommodate changes in the minimum DC bus voltage. In the example of FIG. 2, the controller 113 samples the root-mean-square (RMS) line to line voltage $VLL_{RMS}$ of the AC input for a given control cycle at 206, and uses this in updating or adjusting the non-linear relationship of the second or higher order formula 146. In this example, the controller 113 computes a minimum DC bus voltage value $VDC_{MIN}(t)$ at 214 according to the RMS line to line voltage $VLL_{RMS}$ for the given control cycle. In one implementation, the controller 113 computes the minimum DC bus voltage value $VDC_{MIN}(t)$ at 214 as $1.02*VLL_{RMS}*\sqrt{2}$. At 216, the controller 113 computes the no load DC bus voltage value $VDC_0(t)$ according to the minimum DC bus voltage value $VDC_{MIN}(t)$ for the given control cycle according to a constant k as $VDC_0(t)=k*VDC_{MIN}(t)$. At 218, the controller 113 computes the voltage reference $VDC_{REF}$ for the given control cycle according to the load signal $I_{PU}$, the non-linear relationship, and the no load DC bus voltage value $VDC_0(t)$. In one example, the controller 113 computes $VDC_{REF}$ at 218 using a third order equation as $a(I_{PU})3+b(I_{PU})^2+c(I_{PU})+VDC_0(t)$, using the non-linear equation parameters 146 (e.g., a, b, c) configured at 202. In other examples, a different second or higher order formula can be used, such as a second order equation or a fourth or higher order equation (not shown).

In another implementation, the droop control component 116 implements a lookup table 148 that includes entries that relate load condition of the DC output to the DC bus voltage VDC at the DC output according to the second or higher order formula to compute the DC voltage reference value $VDC_{REF}$ at 218. In one implementation, the lookup table is fixed, and the selective adjustment of the no-load DC bus voltage value is omitted (e.g., 214 and 216 in FIG. 2 can be omitted). In another example, the lookup table includes different sets of entries for different no-load DC bus voltage values, and the DC bus voltage reference is computed at 218 by indexing according to a computer no-load DC bus voltage value for the current rectifier control cycle. In one implementation, the controller 113 indexes the lookup table 148 at 218 according to the DC output current value ($I_{PU}$) (e.g., and optionally according to an updated computed no-load DC bus voltage value) and determines a corresponding DC voltage reference value $VDC_{REF}$. In one implementation, the controller 113 uses linear interpolation or other suitable technique at 210 to select and/or compute a suitable value of the DC voltage reference value $VDC_{REF}$ according to the DC output current value $I_{PU}$ based on the entries of the lookup table 148. In one example, At 220, the controller 113 generates the switching control signals 132 for the active rectifier 111, 112 according to the voltage reference $VDC_{REF}$ to cause a switching circuit to convert the corresponding AC input power from the AC input to control the DC bus voltage VDC.

Figure 3:
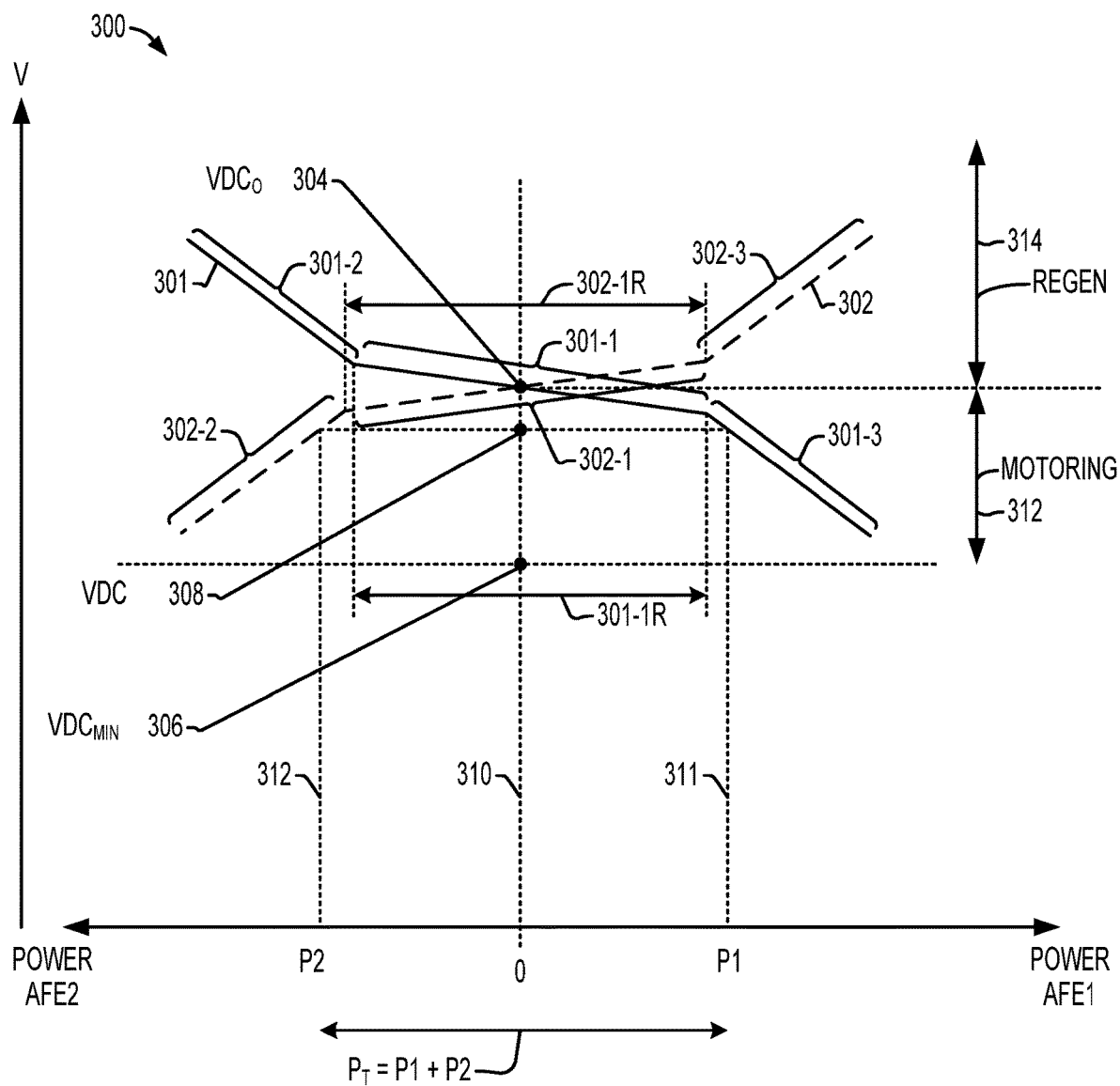
FIG. 3 is a graph.

Referring also to FIG. 3, each segment of the example multi-segment linear droop mechanism (212 in FIG. 2) follows a linear equation y=−ax+b, where "a" is the slope of the line and very critical for load sharing. $VDC_{MIN}$ is the minimum DC bus operating point (e.g., computed in one example as $VLL_{RMS}$*sqrt(2)*1.02. $VDC_0$ is the DC bus at zero loading condition. VDC is the DC bus voltage at a certain loading condition, $VDC<VDC_0$. $P_T$=P1+P2. VDCmax is the maximum DC bus operating point at full regen condition. VDC is the DC bus voltage at a certain loading condition, $VDC>VDC_0$. $P_T$=P1+P2. The DC bus can vary from VDCmax to VDCmin depending on the loading conditions.

A graph 300 in FIG. 3 shows a first curve 301 with segments 301-1, 301-2 and 301-3 implemented by the first controller 113 of the first rectifier 111, and a second curve 302 and includes segments 302-1, 302-2 and 302-3 implemented by the second controller 113 of the second rectifier 112 for multi-segment droop control (e.g., 212 in FIG. 2). Each of the curves 301 and 302 is represented on both sides of a zero power axis 310, where the second and third illustrated portions of each curve (e.g., 301-2 and 301-3, as well as 302-2 and 302-3) are at the same or similar slopes, which are greater than the slopes of the first portions 301-1 and 302-1. The slope settings can be the same for each rectifier 311, 312, or they can be different for each rectifier 311, 312. In the illustrated example, the first portion 301-1 of the first curve 301 has a range 301-1R, and the first portion 302-1 of the second curve 302 has a different range 302-1R. In other implementations, the ranges 301-1R and 302-1R can be the same. The graph 300 also shows the no-load DC bus voltage 304 and the minimum DC bus voltage 306 Each segment of each multi-segment curve has at least one end point. The graph 300 shows operation at one example total power operating point for motoring operation within a motoring range 312, where the DC bus voltage VDC is shown as a point 308. For regeneration operation, the graph 300 shows a regeneration region 314 above the no-load DC bus voltage 304. At the illustrated motoring operating condition, the curve 301 provides for operation of the first rectifier 111 in a first power setting P1, designated 311 in FIG. 3, and the second curve 302 provides for operation of the second rectifier 112 and a second power setting P2, designated 312, where the total power $P_T$=P1+P2.

The droop gain for each segment of each rectifier curve in FIG. 3 represents the slope a in the equation y=−ax+b. In the AFE bus supply parallel application, y is the $VDC_{REF}$ (e.g., the DC bus voltage at a certain loading condition), x is the current in per unit (e.g., $I_{PU}$), and b is the DC bus voltage at no load condition $VDC_0$ for the first segments 301-1, 302-1. Different intercepts for the other segments are determined according to the endpoint of the adjacent segments.

In one example where the droop gain=5%, 480 volt, at no load condition the operating voltage $VDC=VDC_0=1.05*VDC_{MIN}$. Moreover, at full load regen condition the operating voltage $VDC=1.1*VDC_{MIN}$. Therefore, the voltage boost needed is 0.1*480*sqrt(2)*1.02=70 volts. Increasing the DC bus voltage VDC results in increased system losses for single segment linear droop control (IGBT, LCL inductor and capacitors) and system derating that can reach up to 35% of the drive rating.

The droop control component 116 of the controller 113, and the method 200 can be implemented to alleviate this issue and provide improved power operation under several operating conditions. In the example dual-segment implementation, the droop mechanism for each of the rectifiers 111, 112, illustrated by the example curves 301 and 302, can be represented by two linear equations y=−a1x+b1 & y=−a2x+b2. At light load condition the droop (e.g., the segment slope a1 of the first segment 301-1) can be chosen to have a small value, such as "1% or 2%" since accurate load balancing is not important at light load conditions. At higher load conditions, the droop (e.g., the slope of the further segments 301-2 and 301-3) is chosen to have higher values, such as "4% or 5%". The effective DC bus voltage boost will be reduced while maintaining a very good load sharing at higher loading conditions. Assuming the minimum DC bus reference based on the input line voltage is 692 volts, for a standard droop (e.g., 4%), at no load, the DC bus voltage reference $VDC_{REF}$=692+692*0.04=719.7 V. At full load regen, $VDC_{REF}$=692+692*0.08=747.4 V. Derating=−0.528*delta−Vbus=29% at full regen. For a two segment droop (e.g., 2% from 0 to 0.5 pu and 4% from 0.5 pu to 1 pu), the average droop is 3%. At no load $VDC_{REF}$=692+692*0.03=712.5 V. At full load regen, $VDC_{REF}$=692+692*0.06=733.5 V. Operating the system at a lower DC bus voltage results in efficient operation and reduce stress on the drive components As previously discussed, the multi-segment droop control technique can be extended to three-segment droop, fourth-segment droop, where the general case will be the nonlinear droop.

Figure 4:
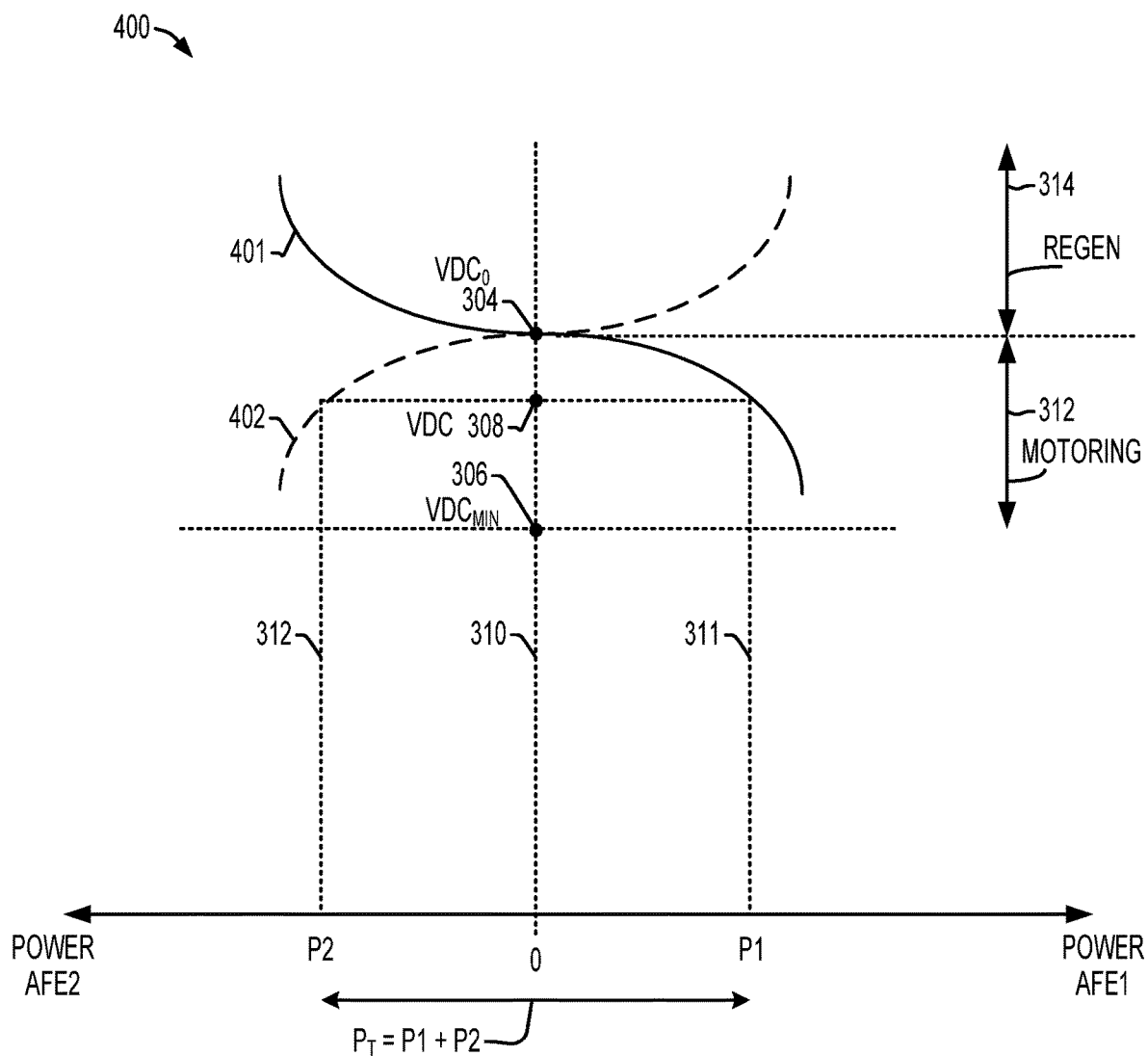
FIG. 4 is a graph.

FIG. 4 includes a graph 400 that shows implementation of non-linear droop control (e.g., 218 in FIG. 2 above). The graph shows a first curve 401 for the first rectifier 111, and a second curve 402 for the second rectifier 112, including a zero power axis 310, the no-load DC bus voltage 304, the minimum DC bus voltage 306, and both a motoring region 312 and a regeneration region 314 as previously described. In this example, the operating DC bus voltage 308 corresponds to a first power P1 (311) for the first rectifier 111, and a second power P2 (312) for the second rectifier 112. In this example, the droop mechanism is represented by one non-linear equation y=$ax^3+bx^2+cx+d$, where "y" is the DC bus voltage and "x" is the loading in per unit (e.g., $I_{PU}$). The slope of the curve varies based on the operating point dy/dx=$3ax^2+2bx+c$. The slopes (e.g., droop gain) can be determined at three operating point and the coefficients can be calculated in real time based on the minimum DC bus voltage "$VDC_{MIN}$". In this example, a third order curve is used, although a second order formula can be used in other implementations, and further examples can use higher order formulas.

The slope "droop gain" can be calculated at dy/dx=y=$3ax^2+2bx+c$. For example, designating the droop at 10% loading to be D1, the droop at 50% loading to be D2, and 75% loading to be D3, the following equations apply:

$$y'(0.1)=-0.01*VDC_{MIN}; \qquad (1)$$

$$y'(0.5)=-0.02*VDC_{MIN}; \qquad (2)$$

$$y'(0.75)=-0.04*VDC_{MIN}; \qquad (3)$$

At full load condition, the DC bus voltage will not go below $VDC_{MIN}$, therefore $$a+b+c+d=VDC_{MIN} \qquad (4)$$

In one example, the minimum DC bus voltage $VDC_{MIN}$ is a predetermined value, which can be calculated as $VLL_{RMS}*sqrt(2)*1.02$ (e.g., at 214 in FIG. 2). As $VDC_{MIN}$ may change in real time based on the calculated root mean square value of the input line voltage, the controller 113 in one example solves equations 1-4 in real time for each given rectifier switching control cycle in order to adjust the curve according to $VDC_{MIN}$.

The following illustrates computations for an example channel-channel droop control implementation using multi-segment droop control (e.g., 212 in FIG. 2):

$$V=V_0-KP \quad (5)$$

Set $V_0=1$ P.u, $K=0.04$
at full load condition:

$$V=1-(0.04)(1)=0.93 \text{ p.u.} \quad (5a)$$

the following applies for a two segment droop implementation:

$$V=V_0^1-K_0P_0-K_1(P-P_0) \quad (20)$$

Where $P>P_0$

Therefore, $V=V_0^1-K_0P_0-K_1(P-P_0)$ (6)

Comparing equations 5 and 6 yields the following:

$$V_0=V_0^1-K_0P_0+K_1P_0$$

set $K_0=0.02$, $P_0=0.5$, $K_1=0.04$

Therefore $1=V_0^1-(0.02)(0.5)+(0.04)(0.5)$

Therefore $V_0^1=0.99$ p.u.
At full load conditions, the following applies:

$$V=0.99-(0.02)(0.5)+(0.04)(0.5)-(0.04) \quad (5)$$

$$0.99-0.01+0.02-0.04 \quad (6a)$$

In this example, the final voltage from (5a) and (6a) is the same.

In one example, for 1 P.U.=720 volts, $V_0=720$ $$V_0^1=(720)(0.99)=712.8$$

In both cases "final voltage V after droop" is given by:

$$V=(0.96)(720)=691.2$$

The following illustrates computations for an example channel-channel droop control implementation using non-linear droop control (e.g., 218 in FIG. 2):

$$y=ax^3+bx^2+cx+d \quad (7)$$

y=DC bus voltage
x=loading in p.u.

therefore $y^1=3ax^2+2bx+c$

If the non-linear curve is designed such that droop=0.01 at 10% loading, droop=0.02 at 50% loading, and droop=0.04 at 75% loading, the following applies:

$$y^1(0.1)=(-0.01)(VDC_{min})$$

$$y^1(0.5)=(-0.02)(VDC_{min})$$

$$y^1(0.75)=(-0.04)(VDC_{min})$$

Where $VDC_{min}=(V_{LL})(\sqrt{2})(1.02)$ therefore $3a(0.1)^2+2b(0.1)+c=(-0.01)(VDC_{min})$ Also, $$3a(0.5)^2+2b(0.5)+C=(-0.02)(VDC_{min})$$

Also, $$3a(0.75)^2+2b(0.75)+C=(-0.04)(VDC_{min})$$

therefore $$0.03a+0.2b+c=(-0.01)(VDC_{min}) \quad (7)$$

$$0.75a+b+c=(-0.02)(VDC_{min}) \quad (8)$$

$$1.6875a+1.5b+c=(-0.04)(VDC_{min}) \quad (9)$$

And at full load the DC Bus voltage cannot go below $VDC_{min}$

Therefore $a+b+c+d=VDC_{min}$ (10)

Assembled, (1), (2), (3), (10) provides the following:

$$\begin{bmatrix} 0.03 & 0.2 & 1 & 0 \\ 0.75 & 1 & 1 & 0 \\ 1.3875 & 1.5 & 1 & 0 \\ 1 & 1 & 1 & 0 \end{bmatrix} \begin{bmatrix} a \\ b \\ c \\ d \end{bmatrix} = \begin{bmatrix} -0.01 \\ -0.02 \\ -0.04 \\ 1 \end{bmatrix} VDC_{min}$$

Solving this set of equations for (9) yields the following:

$$V_{LL}=480+\sqrt{2}+1.02=692.3$$

$a=-19.529$, $b=8.9213$
$c=-8.1224$, $d=711.1303$ therefore $y=(-19.529)(x^3)+(8.9213)(x^2)+(-8.1224)(x)+711.1303$ at $x=0$, $y=VDC=711.1303$
at $x=1$ $$y^1=3(-19.529)(1)^2+2(8.9213)(1)+(-8.1224)$$

$y^1=-48.86$ therefore droop $= \dfrac{-48.86}{692.3} = -0.07$ notice that a, b, c, d has to be solved in real time as $Vd_{min}$ varies in real time.

For regen operation, curve (10)
Odd symmetry can be used where $\Delta Vd_{motor}=VDC_0-(ax^3+bx^2+cx+d)$ therefore $VDC_{regen}=VDC_0+\Delta VDC_{motor}$ notice $\Delta VDC_{regen}$ at the same loading condition for 480 volts $$VDC_{max}=711+(711-692.3)=729.7$$

The following is an example nonlinear method of finding $VDC_{REF}$ reference based on nonlinear equation $y=ax^3+bx^2+cx+d$. The method 200 above in one example controls droop indirectly in a parabolic shape based on cubic $VDC_{REF}$ equation. In one example, setting the no load droop gain to be $D_1$, the full load droop gain to be $D_2$, and a droop boost to be $D_3$, a no load droop gain percent $(D_{n1})=D_1*(1-D_3)$, and a full load droop gain percent $(D_{f1})=D_2*(1+D_3)$. In this example, the following computations apply:

$$V_{DCDroopRef}=-((\tfrac{1}{3})(D_{f1}-D_{n1}))(I_{qREF})^3-D_{n1}(I_{qREF})+(\tfrac{1}{3})(D_{f1}+2*D_{n1}) \quad (11)$$

$V_{DCRef}=V_{DCDroopRef}+V_{DCMinOpt}$ (units in pu) (12)

$$V_{DCDroop}=-(D_{f1}-D_{n1})(I_{qREF})^2-D_{n1} \quad (13)$$

Parameter limits for this example are given as follows:

$$V_{DCMaxPu}=(V_{DCMax}/V_{DCMinOpt})-1 \quad (14)$$

$$D_{n1Max}=\text{Min}(0.05, D_{n1}) \quad (15)$$

Using Full load regen $I_{qREF}=(-1)$ pu in equation (1) at max $V_{DCRef}$, $$D_{f1Max}=(\tfrac{1}{2})(3*V_{DCMaxPu}-4*D_{n1})$$

Figure 5:
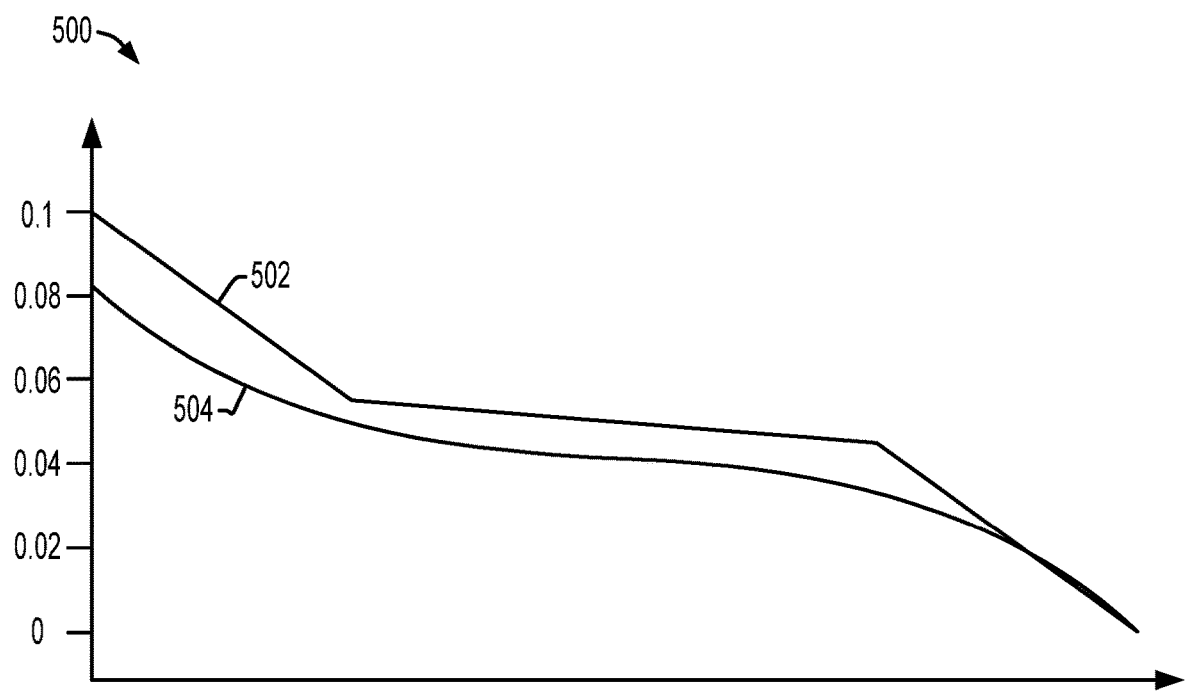
FIG. 5 is a waveform diagram.
Figure 6:
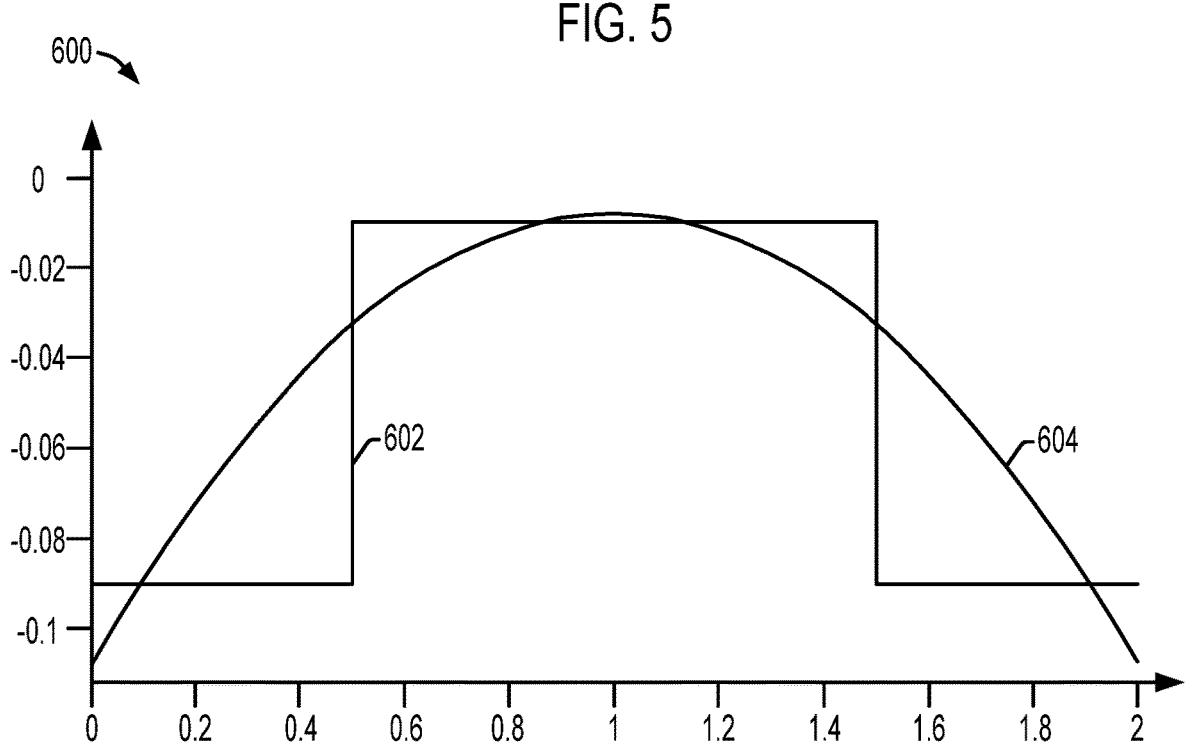
FIG. 6 is a waveform diagram.

Referring to FIGS. 5 and 6, FIG. 5 shows a graph 500 with a curve 502 showing a linear DC bus voltage reference $VDC_{REF}$ as a function of loading for motoring operation, and a curve 504 showing a cubic non-linear DC bus voltage reference $VDC_{REF}$. FIG. 6 shows a graph 600 with a curve 602 of linear droop curve as a function of loading for motoring operation and regen, and a curve 604 showing an example cubic non-linear droop control formula. In this example, the inputs are as follows:

Inputs: $I_{qREF}=-1$ to 1 pu in 2 secs
$D_{n1}=0.01$
$D_{f1}=0.09$
Droop Boost=0.2 (20%)

Figure 7:
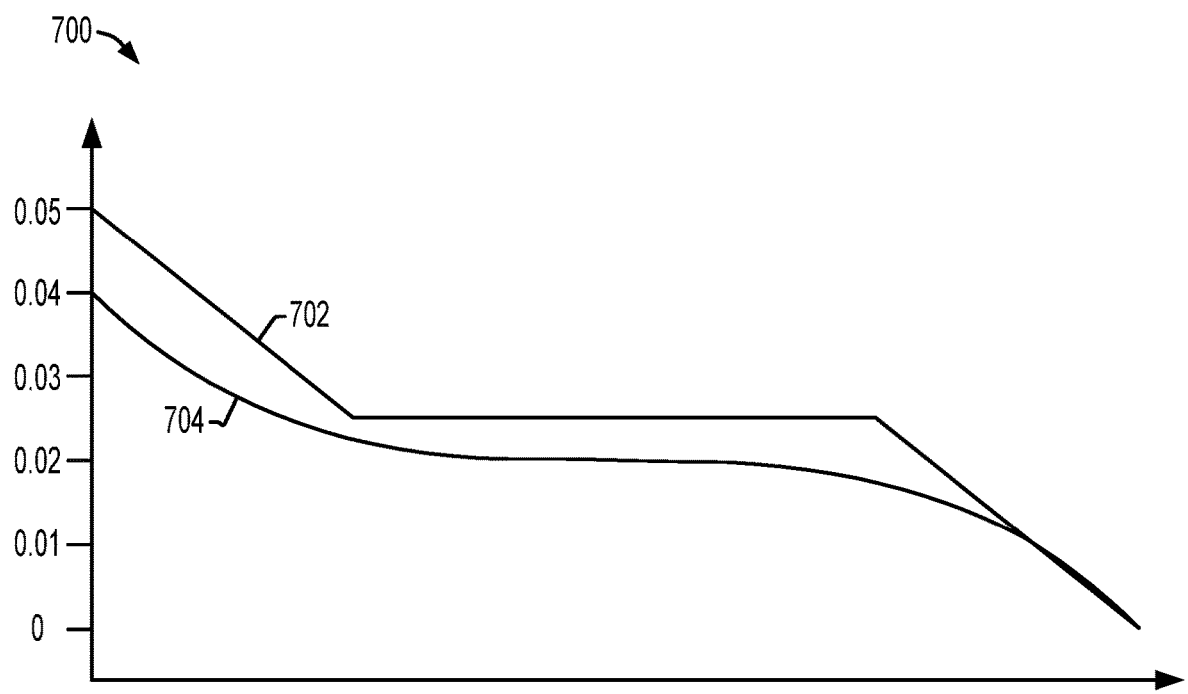
FIG. 7 is a waveform diagram.
Figure 8:
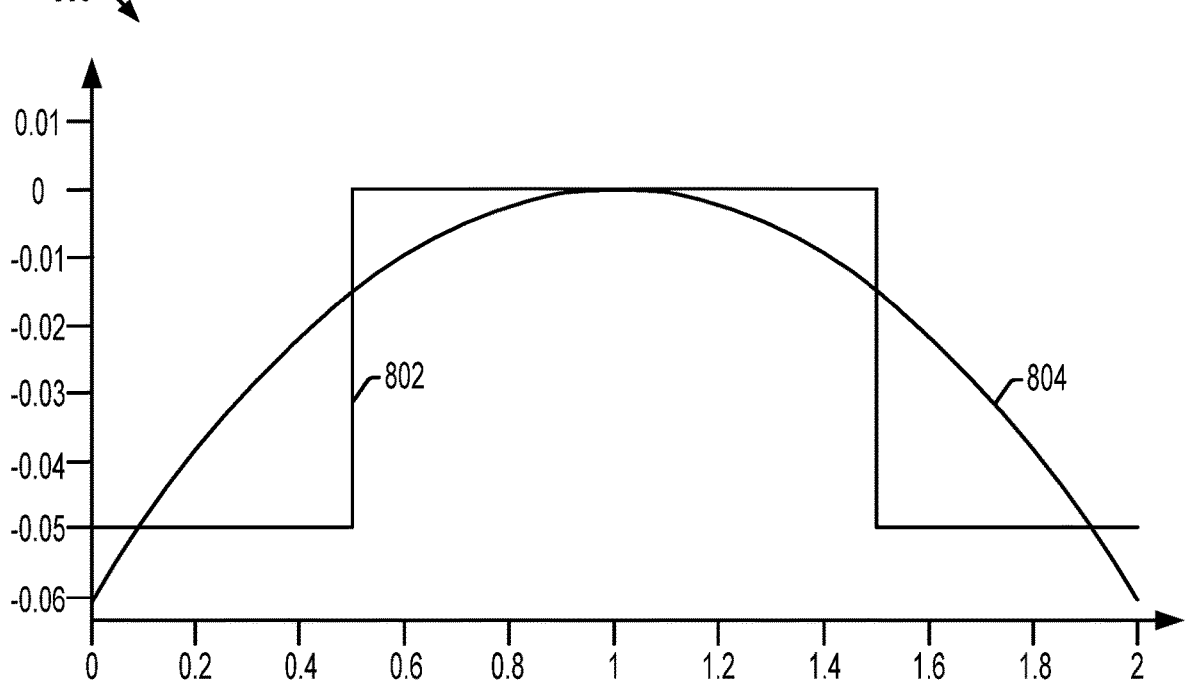
FIG. 8 is a waveform diagram.

Referring to FIGS. 7 and 8, FIG. 7 shows a graph 700 with a curve 702 showing a linear DC bus voltage reference $VDC_{REF}$ as a function of loading for motoring operation, and a curve 704 showing a cubic non-linear DC bus voltage reference $VDC_{REF}$. FIG. 8 shows a graph 800 with a curve 802 of linear droop curve as a function of loading for motoring operation, and a curve 804 showing an example cubic non-linear droop control formula. In this example, the inputs are as follows:

Inputs: $I_{qREF}=-1$ to 1 pu in 2 secs
$D_{n1}=0.0$
$D_{f1}=0.05$
Droop Boost=0.2 (20%)

Figure 9:
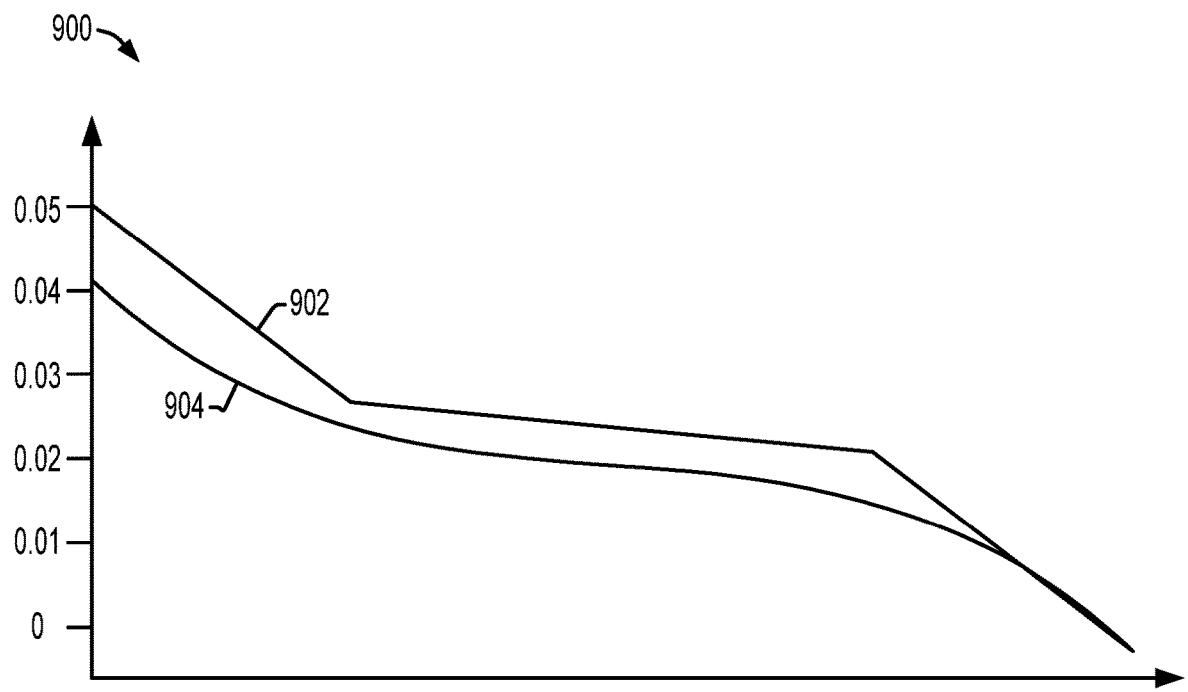
FIG. 9 is a waveform diagram.
Figure 10:
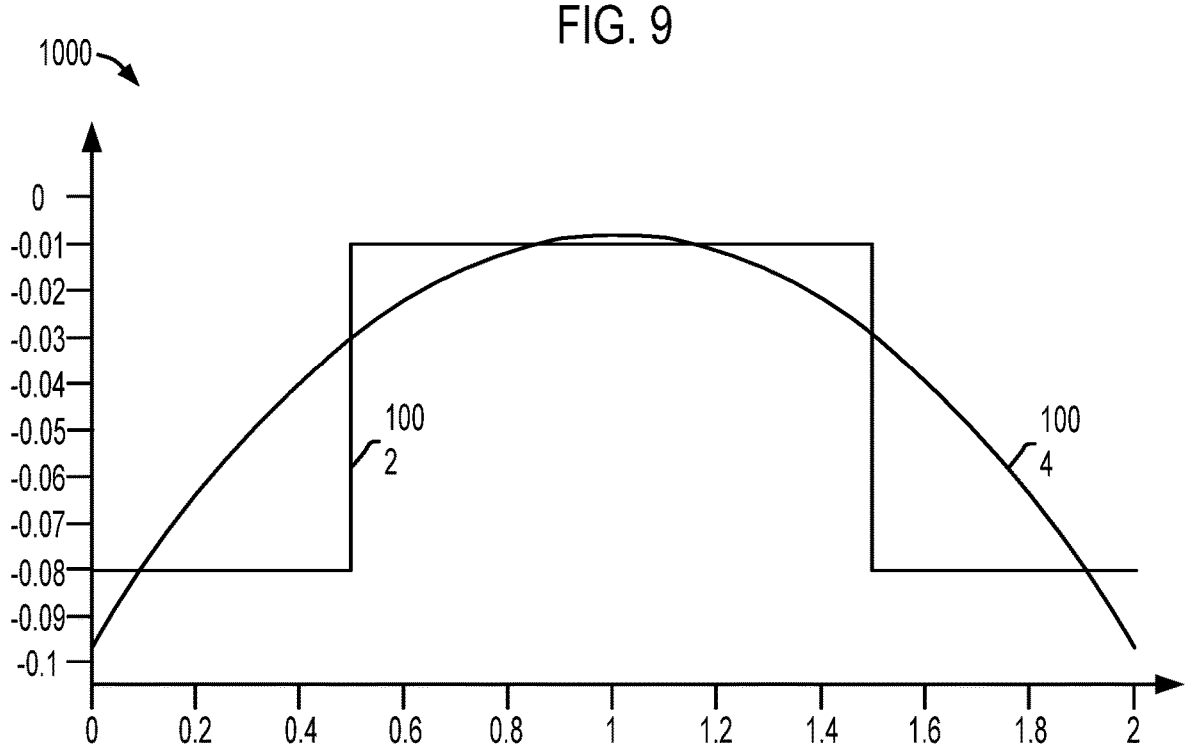
FIG. 10 is a waveform diagram.

Referring to FIGS. 9 and 10, FIG. 9 shows a graph 900 with a curve 902 showing a linear DC bus voltage reference $VDC_{REF}$ as a function of loading for motoring operation, and a curve 904 showing a cubic non-linear DC bus voltage reference $VDC_{REF}$. FIG. 10 shows a graph 1000 with a curve 1002 of linear droop curve as a function of loading for motoring operation, and a curve 1004 showing an example cubic non-linear droop control formula. In this example, the inputs are as follows:

Inputs: $I_{qREF}=-1$ to 1 pu in 2 secs
$D_{n1}=0.01$
$D_{f1}=0.08$
Droop Boost=0.2 (20%)

Figure 11:
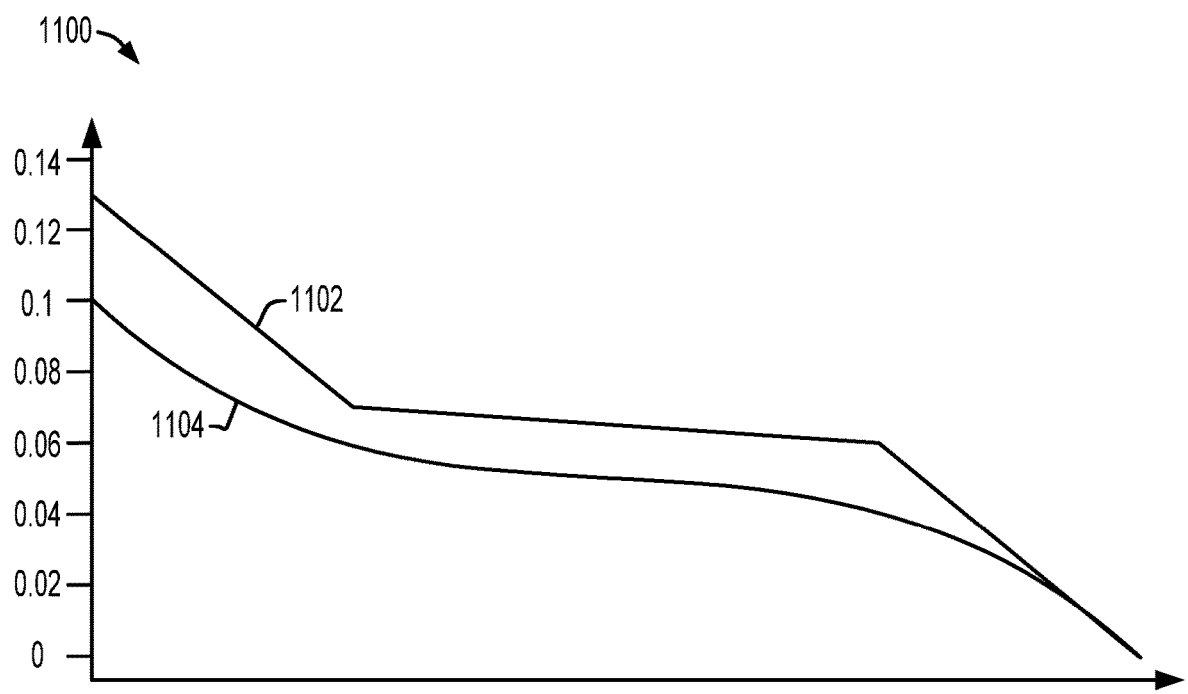
FIG. 11 is a waveform diagram.
Figure 12:
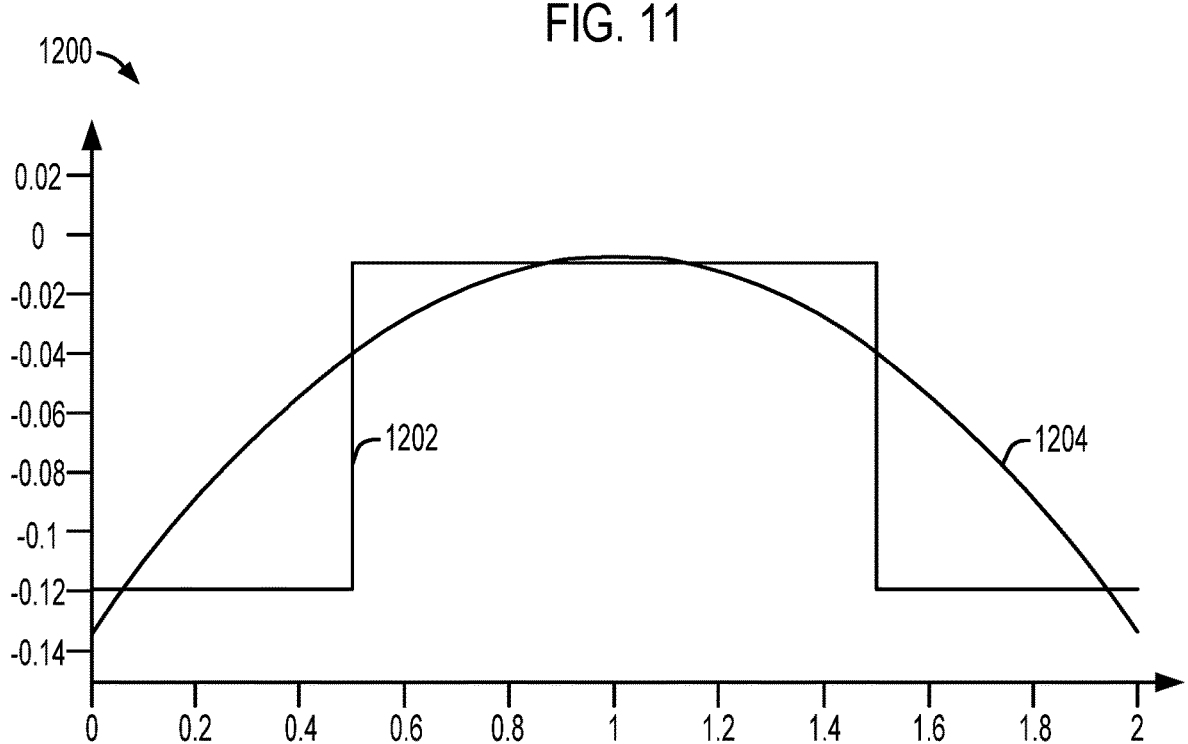
FIG. 12 is a waveform diagram.

Referring to FIGS. 11 and 12, FIG. 11 shows a graph 1100 with a curve 1102 showing a linear DC bus voltage reference $VDC_{REF}$ as a function of loading for motoring operation, and a curve 1104 showing a cubic non-linear DC bus voltage reference $VDC_{REF}$. FIG. 12 shows a graph 1200 with a curve 1202 of linear droop curve as a function of loading for motoring operation, and a curve 1204 showing an example cubic non-linear droop control formula. In this example, the inputs are as follows:

Inputs: $I_{qREF}=-1$ to 1 pu in 2 secs
$D_{n1}=0.01$
$D_{f1}=0.12$
Droop Boost=0.2 (20%)
$V_{DCmax}=770V$
$V_{DCmin}=700V$ Another aspect provides non-linear droop control by defining the desired output droop gain as a second order curve relationship between the droop gain and the active q-axis current as below:

$$\text{droopGain}=a \times I_q^2 + b \times I_q + c \quad (15)$$

Where the coefficients a, b, and c are calculated depending on two droop gain parameters (k1=light load gain, and k2=high load gain) and a q-axis transition current (Iq_Trans) which can form any second order droop curve in equation (15).

By integrating the second order Droop Gain equation (15), the DC link droop voltage reference can be calculated as follows:

$$V_{dc\_droop\_ref} = \frac{a}{3} \times I_q^3 + \frac{b}{2} \times I_q^2 + c \times I_q + c_1 \quad (16)$$

Where $$c_1 = -\left(\frac{a}{3} + \frac{b}{2} + c\right)$$

represents the No-load Droop DC link voltage at Iq=0.

In various implementations, a linear single slope droop is fairly simple to implement, but suffers from significant DC bus voltage increase that reduces the efficiency of the drive and cause severe de-rating. The example dual segment droop (e.g., FIG. 3 above, where the second and third segments are identical, but separately used for motoring and regeneration) uses two different slopes. As a result, the DC bus voltage increase is less than the standard droop, which can facilitate improved efficiency and reduced de-rating. The concept can be generalized as described above to an integer number n droop segments, where n is greater than or equal to 2. The nonlinear droop (e.g., FIG. 4 above) provides one or more non-linear droop curves in the form of $y=a_1x^n+a_2x^{(n-1)}+a_3x^{(n-2)}+\ldots+a_n$. In spite of potentially increased complexity, the nonlinear droop results in good performance by reducing the DC bus voltage boost while maintain a sharing unbalance of 5% at full load condition in one example. The reduction of DC bus voltage boost reduces inductor losses in any included LCL filter, and can help reduce the deratings of the overall system. Various possible implementations can increase the effective drive rating, such as for motor drive applications, and increase the system efficiency while maintaining adequate load sharing between the units working in parallel. Moreover, specific implementations can combine multiple active rectifiers of different ratings, with the autonomous multi-segment and/or non-linear droop control providing the above advantages in addition to flexibility of pairing multiple active rectifiers in a shared DC bus system.

In the preceding specification, various embodiments have been described with reference to the accompanying drawings. It will be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A rectifier, comprising:
   an AC input, including AC nodes;
   a DC output, including first and second DC nodes;
   a switching circuit coupled with the AC input and with the DC output, the switching circuit including switching devices respectively configured to selectively couple one of the AC nodes with a respective one of the first and second DC nodes according to a respective switching control signal; and
a controller configured to:
compute a voltage reference according to:
a load signal of the DC output, and
a non-linear relationship between an electrical load condition of the DC output and a DC bus voltage at the DC output, and
generate the switching control signals according to the voltage reference to cause the switching circuit to convert AC input power from the AC input to control the DC bus voltage at the DC output;
wherein the non-linear relationship is a multi-segment function with multiple segments having different respective slopes that relate the load condition of the DC output to the DC bus voltage at the DC output.

2. The rectifier of claim 1, wherein the load signal of the DC output is a DC output current signal of the DC output.

3. The rectifier of claim 1, wherein the multi-segment function includes more than two segments having different respective slopes that relate the load condition of the DC output to the DC bus voltage at the DC output.

4. The rectifier of claim 1, wherein the multi-segment function is piecewise linear.

5. The rectifier of claim 1, wherein the multi-segment function includes a curvilinear segment.

6. A rectifier, comprising:
an AC input, including AC nodes;
a DC output, including first and second DC nodes;
a switching circuit coupled with the AC input and with the DC output, the switching circuit including switching devices respectively configured to selectively couple one of the AC nodes with a respective one of the first and second DC nodes according to a respective switching control signal; and
a controller configured to:
compute a voltage reference according to:
a load signal of the DC output, and
a non-linear relationship between an electrical load condition of the DC output and a DC bus voltage at the DC output, and
generate the switching control signals according to the voltage reference to cause the switching circuit to convert AC input power from the AC input to control the DC bus voltage at the DC output;
wherein the non-linear relationship is a second or higher order formula that relates the load condition of the DC output to the DC bus voltage at the DC output.

7. The rectifier of claim 6, wherein the load signal of the DC output is a DC output current signal of the DC output.

8. The rectifier of claim 6, wherein the controller includes a lookup table with entries that relate load conditions of the DC output to respective DC bus voltages at the DC output according to the second or higher order formula.

9. The rectifier of claim 6, wherein the controller is configured to solve the second or higher order formula to compute the voltage reference for a measured load condition of the DC output for a given control cycle.

10. The rectifier of claim 9, wherein the controller is configured to:
sample a root-mean-square line to line voltage of the AC input for a given control cycle;
compute a minimum DC bus voltage value according to the root-mean-square line to line voltage for the given control cycle;
compute a no load DC bus voltage value according to the minimum DC bus voltage value for the given control cycle; and
compute the voltage reference for the given control cycle according to the load signal, non-linear relationship, and the no load DC bus voltage value.

11. The rectifier of claim 6, wherein the controller is configured to:
sample a root-mean-square line to line voltage of the AC input for a given control cycle;
compute a minimum DC bus voltage value according to the root-mean-square line to line voltage for the given control cycle;
compute a no load DC bus voltage value according to the minimum DC bus voltage value for the given control cycle; and
compute the voltage reference for the given control cycle according to the load signal, non-linear relationship, and the no load DC bus voltage value.

12. A power conversion system, comprising
a first rectifier, comprising:
a first AC input, including first AC nodes,
a first DC output, including first and second DC nodes,
a first switching circuit coupled with the first AC input and with the first DC output, the first switching circuit including first switching devices respectively configured to selectively couple one of the first AC nodes with a respective one of the first and second DC nodes according to a respective first switching control signal, and
a first controller configured to:
compute a first voltage reference according to:
a first load signal of the first DC output, and
a first non-linear relationship between a first electrical load condition of the first DC output and a DC bus voltage across the first and second DC nodes, and
generate the first switching control signals according to the first voltage reference to cause the first switching circuit to convert AC input power from the first AC input to control the DC bus voltage; and
a second rectifier, comprising:
a second AC input, including second AC nodes,
a second DC output connected to the first and second DC nodes of the first DC output,
a second switching circuit coupled with the second AC input and with the first DC output, the second switching circuit including second switching devices respectively configured to selectively couple one of the second AC nodes with a respective one of the first and second DC nodes according to a respective second switching control signal, and
a second controller configured to:
compute a second voltage reference according to:
a second load signal of the second DC output, and
a second non-linear relationship between a second electrical load condition of the second DC output and the DC bus voltage, and
generate the second switching control signals according to the second voltage reference to cause the second switching circuit to convert AC input power from the second AC input to control the DC bus voltage.

13. The power conversion system of claim 12, wherein the respective first and second non-linear relationships are multi-segment functions with multiple segments having different respective slopes that relate the load condition of the DC output to the DC bus voltage.

14. The power conversion system of claim 12, wherein the respective first and second non-linear relationships are second or higher order formulas that relate the respective load conditions of the first and second DC outputs to the DC bus voltage.

15. The power conversion system of claim 12,
wherein the first load signal of the first DC output is a first DC output current signal of the first DC output; and
wherein the second load signal of the second DC output is a second DC output current signal of the second DC output.

16. A method, comprising:
computing a voltage reference according to:
a load signal of a DC output of an active rectifier, and
a non-linear relationship between an electrical load condition of the DC output and a DC bus voltage at the DC output; and
generating switching control signals for the active rectifier according to the voltage reference to cause a switching circuit of the active rectifier to convert AC input power from an AC input to control the DC bus voltage;
wherein the non-linear relationship is a multi-segment function with multiple segments having different respective slopes that relate the load condition of the DC output to the DC bus voltage at the DC output.

17. The method of claim 16, further comprising:
sampling a root-mean-square line to line voltage of the AC input for a given control cycle;
computing a minimum DC bus voltage value according to the root-mean-square line to line voltage for the given control cycle;
computing a no load DC bus voltage value according to the minimum DC bus voltage value for the given control cycle; and
computing the voltage reference for the given control cycle according to:
the load signal,
non-linear relationship, and
the no load DC bus voltage value.

18. The method of claim 16, wherein the load signal of the DC output is a DC output current signal of the DC output.

19. A method, comprising:
computing a voltage reference according to:
a load signal of a DC output of an active rectifier, and
a non-linear relationship between an electrical load condition of the DC output and a DC bus voltage at the DC output; and
generating switching control signals for the active rectifier according to the voltage reference to cause a switching circuit of the active rectifier to convert AC input power from an AC input to control the DC bus voltage;
wherein the non-linear relationship is a second or higher order formula that relates the load condition of the DC output to the DC bus voltage at the DC output.

20. The method of claim 19, wherein the load signal of the DC output is a DC output current signal of the DC output.

* * * * *